United States Patent [19]

Cross

[11] 3,836,956

[45] Sept. 17, 1974

[54] METHOD AND APPARATUS FOR DECODING BIPHASE SIGNALS

[75] Inventor: Charles Cross, Glenside, Pa.

[73] Assignee: Robertshaw Controls Company, Richmond, Va.

[22] Filed: Dec. 12, 1972

[21] Appl. No.: 314,307

[52] U.S. Cl. .......................... 340/146.1 AB, 325/42

[51] Int. Cl. ...................... G08c 25/00, H04b 15/00

[58] Field of Search ........... 340/146.1 AB, 146.1 R; 325/41, 42, 38 R; 178/67, 68; 328/164

[56] References Cited

UNITED STATES PATENTS

| | | | |
|---|---|---|---|
| 3,335,224 | 8/1967 | Melener et al. | 340/146.1 AB |
| 3,418,631 | 12/1968 | Sipress et al. | 340/146.1 AB |
| 3,467,777 | 9/1969 | Rumble | 325/38 R |
| 3,514,706 | 5/1970 | Dupraz et al. | 178/68 |
| 3,671,935 | 6/1972 | Lipp et al. | 325/41 |
| 3,705,398 | 12/1972 | Kostenbauer et al. | 178/68 |

*Primary Examiner*—Charles E. Atkinson
*Attorney, Agent, or Firm*—Anthony A. O'Brien

[57] ABSTRACT

A method and apparatus for decoding biphase signals are disclosed in which each bit of a received biphase signal causes generation of a window in which the next successive bit must fall. By this means the received message is distinguished from noise and timed. The received signal message preferably includes a synchronization code and a double word body formed by a single word which is transmitted twice. The synchronization code is examined for both timing and pattern. The second word is compared bit by bit with the first word to verify the received message and further preclude the possibility of noise being erroneously considered as a message bit. If the two words are not identical this indicates an error and all further action is inhibited.

12 Claims, 4 Drawing Figures

PATENTED SEP 17 1974 3,836,956

SHEET 1 OF 4

METHOD AND APPARATUS FOR DECODING BIPHASE SIGNALS

BACKGROUND OF THE INVENTION

1. Field of the Invention

The present invention relates to a method and apparatus for decoding biphase signals and in particular to a method and apparatus which will clearly distinguish a received message from any noise which may be generated along the transmission line and which might otherwise be confused with the bits of the message.

2. Description of the Prior Art

In the arts that require the transmission of data, there is always the problem of distinguishing the bits of the received message from noise, such as electromagnetic and electrostatic interference, which may be generated along the transmission line. There have been many attempts made to overcome these problems, such as by the use of level comparators, filters, and complex timing and synchronizing means. However, all previous attempts have required much complicated and expensive apparatus which did not, in all cases, prove to be successful in decoding the incoming message.

Other attempts have been made to verify the accuracy of the message. However, most of these attempts were directed to a redundancy system which was still subject to error with the error simply being repeated.

SUMMARY OF THE INVENTION

The present invention is characterized by a line receiver connected to take signals from a transmission line and send them in converted form to a receiver sequencer. The line receiver includes a comparator for distinguishing the incoming message from noise at a set level and for generating positive and negative output pulses as well as positive and negative output levels. The receiver sequencer receives these pulses and levels and causes a window to be generated in response to the first pulse received and each time the next successive pulse falls within the time span of the preceding generated window to thereby time the pulses while distinguishing them from noise.

It is therefore an object of the present invention to produce a method and apparatus for decoding biphase signals which will accurately distinguish the incoming message from all types of noise generated on a transmission line during transmission of a message.

It is also an object of the present invention to produce a method and apparatus for decoding biphase signals in which each bit received will cause a window to be generated during which the next successive bit of the message must be received and thus provide for both self timing of the received message and discrimination from noise.

It is another object of the present invention to construct a line receiver which will take signals from a transmission line, discriminate against low amplitude noise, attenuate high frequencies, reduce common mode noise, protect against over voltage or high noise peaks and provide an output comprised of positive and negative levels and positive and negative pulses representing the received message.

It is a further object of the present invention to construct a receiver sequencer which will cause a window to be generated by each received bit, determine when the next pulse is received within that window, distinguish a sychronization signal by timing and pattern before allowing the remainder of the message to be registered, and make a bit by bit comparison of two words forming a double word body of the message thereby assuring the accuracy of the received message.

The foregoing and other objects and advantages of the present invention will become apparent from the following detailed description of a preferred embodiment taken in connection with the accompanying drawings.

DESCRIPTION OF THE PREFERRED EMBODIMENT

In any data transmission system the selection of code format and method of identifying information is extremely important since much of the speed, efficiency and reliability of the system depends upon this code. The present system employs a biphase Manchester code in which only the transitions through zero, or a reference level, in the middle of each bit are considered.

Figure 1:
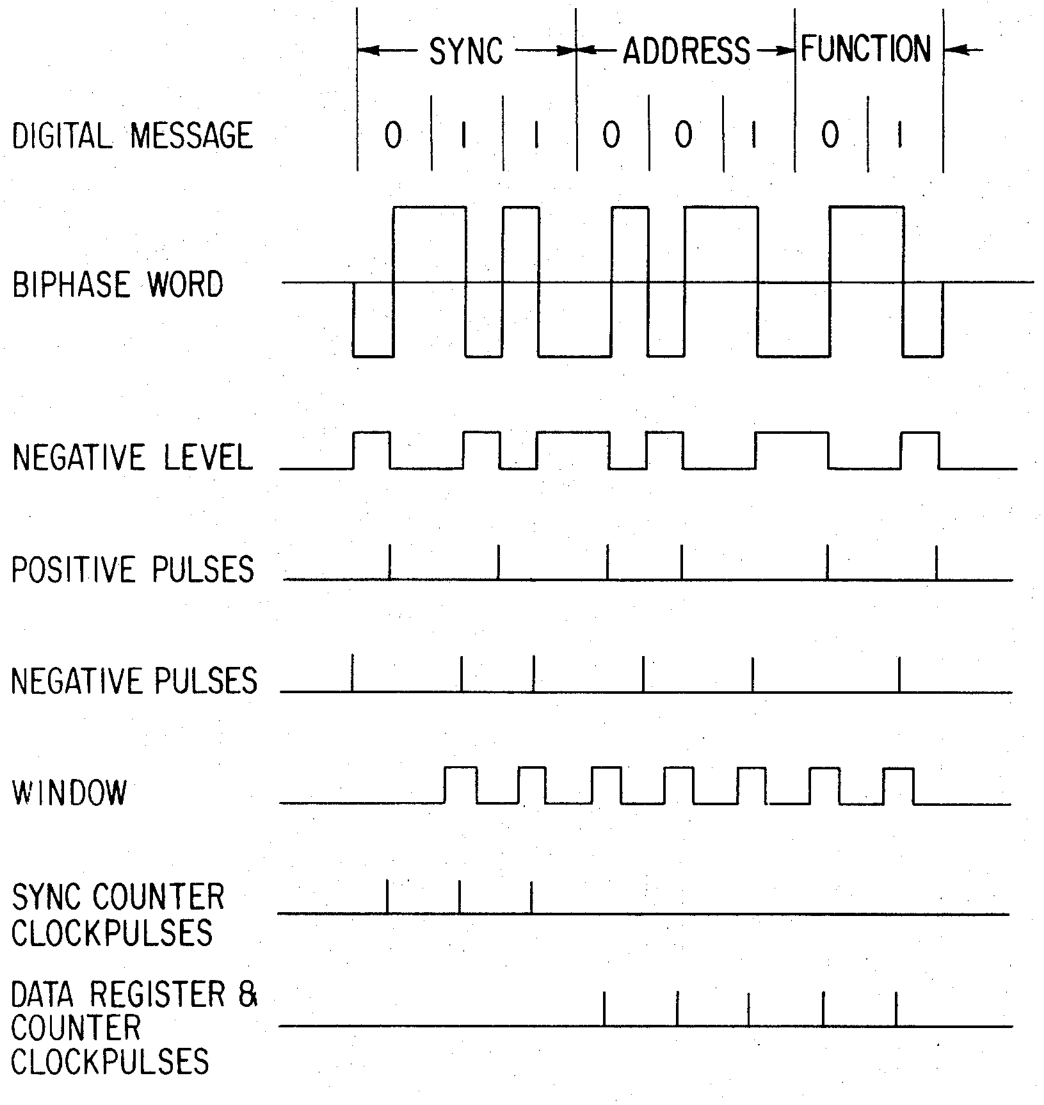
FIG. 1 is a timing wave form chart for the received signal.

Referring to FIG. 1, an eight bit digital message is illustrated with the eight bits broken down as a three bit synchronization code, a three bit address, and a two bit instruction. Of course any number of bits may be used for a message and their arrangement changed to suit needs. However, an exemplary message comprises 35 bits including a three bit synchronization code and a 16 bit word which is transmitted twice; that is, the messages preferably have a double word body formed by first and second identical words. The synchronization code preferably has a "011" format as shown. The biphase word corresponds to the digital message with a positive going transition in the middle of a bit representing "0" and a negative going transition in the middle of a bit representing "1". This is shown as a return to zero code, in inverted form, as the negative level. Positive pulses and negative pulses are derived from the positive going transitions and the negative going transitions, respectively, of the biphase word. The synchronizing code is recognized by the "011" digital code. The first bit (0) causes a first window to be generated and which will be open when the next transition in the middle of a bit should arrive. If the next portion of the synchronizing code (the negative going transition indicating a "1") is received within the time span of this first window, then a second window is generated and so on for the rest of the message. However, if a window is generated and no transition received during its time span, then the entire message will be rejected.

Figure 2:
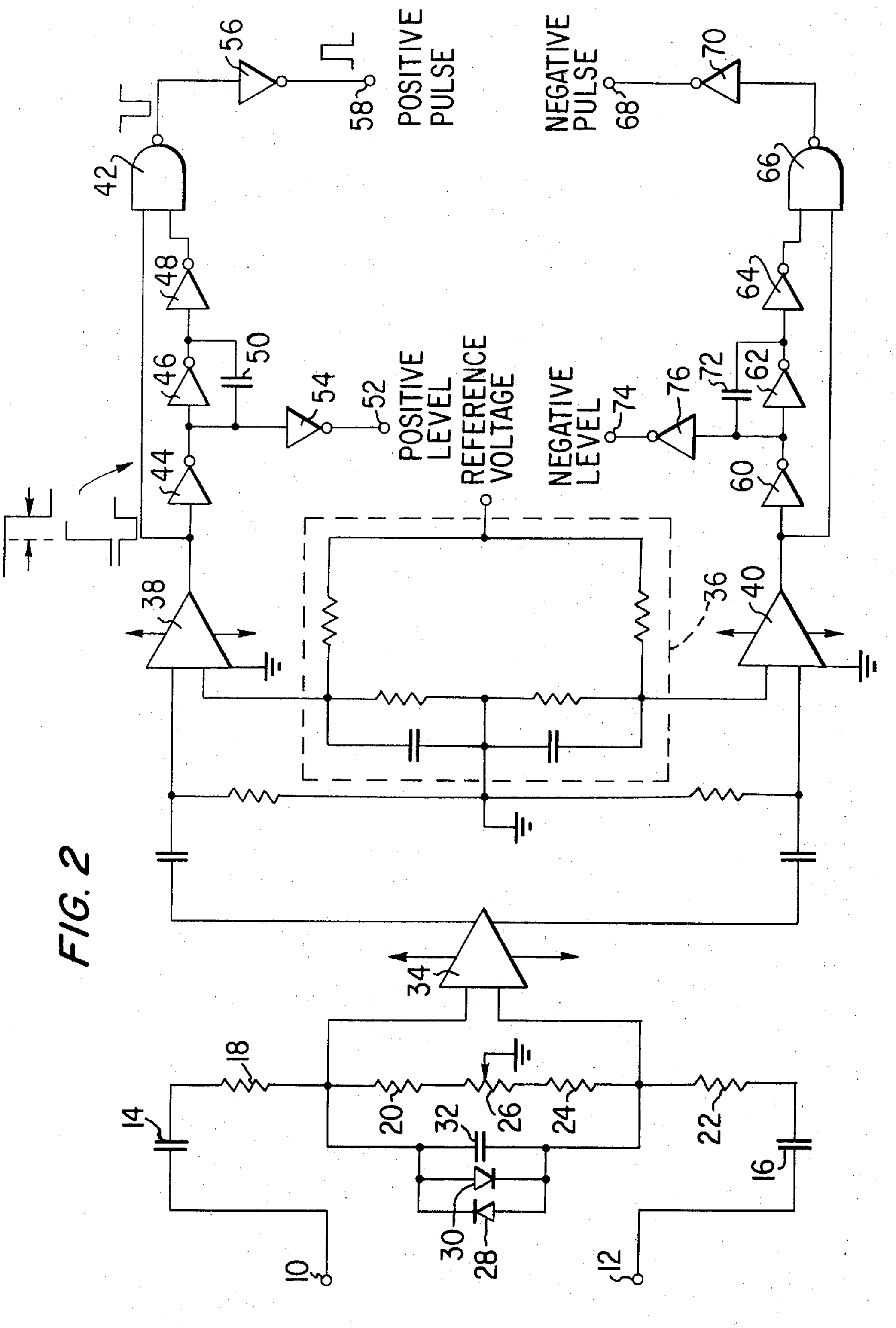
FIG. 2 is a schematic diagram of a line receiver according to the present invention.

The line receiver, FIG. 2, has terminals 10 and 12 connected to a transmission line (not shown). Connected across these terminals is a circuit including capacitors 14 and 16, each having high reactance at low frequency, and resistors 18, 20, 22, 24 serially connected between the respective capacitors 14 and 16 and potentiometer 26. This resistive capacitive circuit provides high attenuation at 60 cycles while the potentiometer 26 provides adjustment for common mode rejection.

A limiting circuit, including oppositely connected parallel diodes 28 and 30 and capacitor 32 connected parallel to the diodes, is connected across resistors 20 and 24 and potentiometer 26. The diodes serve to limit the input to amplifier 34 and thus allow the receiver to be connected anywhere along the transmission line from the transmitter and yet not be overpowered by the signal generated near the transmitter. The capacitor 32 provides high frequency cutoff.

Amplifier 34 is a high speed differential operational amplifier and is connected across resistors 20 and 24 and potentiometer 26 and across the above described limiting circuit. The amplifier has positive and negative outputs which are compared to a reference voltage from supply circuit 36 by comparators 38 and 40, respectively.

The output of the positive comparator 38 is fed to a pulse forming circuit including a direct line connected to one input of NAND gate 42 and a delay line, formed by series connected inverters 44, 46 and 48, connected to the other input of NAND gate 42. The direct connection forms the leading edge and the delay line forms the trailing edge of a square wave output from NAND gate 42. A capacitor 50 is connected across inverter 46 and a positive level output at terminal 52 is taken from between inverters 44 and 46 through inverter 54. The square wave output from NAND gate 42 is passed through inverter 56 to positive pulse output terminal 58.

A similar arrangement is connected to the output of the negative comparator 40 and includes inverters 60, 62 and 64 forming the delay line to NAND gate 66, a negative pulse output terminal 68 connected to the output of NAND gate 66 through inverter 70, a capacitor 72 connected across inverter 62, and a negative level output at terminal 74 is taken from between inverter 60 and 62 and through inverter 76.

The function of the line receiver is to take signals from the transmission line and convert them to a series of positive and negative level and pulse outputs. The line receiver also discriminates against low amplitude noise since the comparators 38 and 40 require that the signals exceed a certain fixed value before an output is obtained. The function of the RC network at the input is to provide high rejection of 60 cycle noise to the input of the amplifier 34 while capacitor 32 attenuates high frequences. Common mode rejection by the input circuit effectively reduces common mode noise to a point where signals can be satisfactorily received. Diodes 28 and 30 are connected across the amplifier input to protect the circuit from unintentional overvoltage or high noise peaks.

Figure 3A:
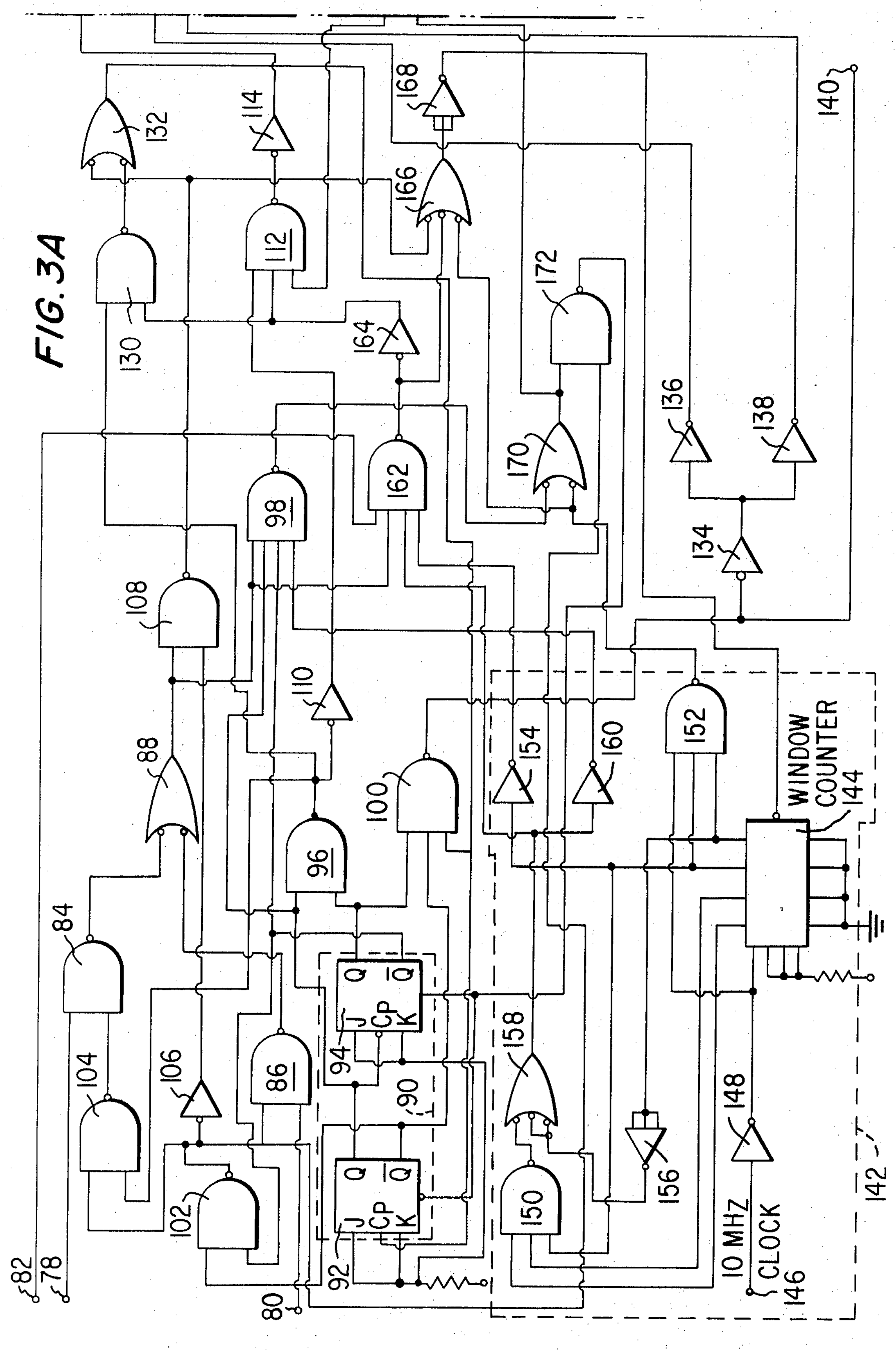
FIGS. 3A and 3B together are a schematic diagram of a receiver sequencer according to the present invention.
Figure 3B:
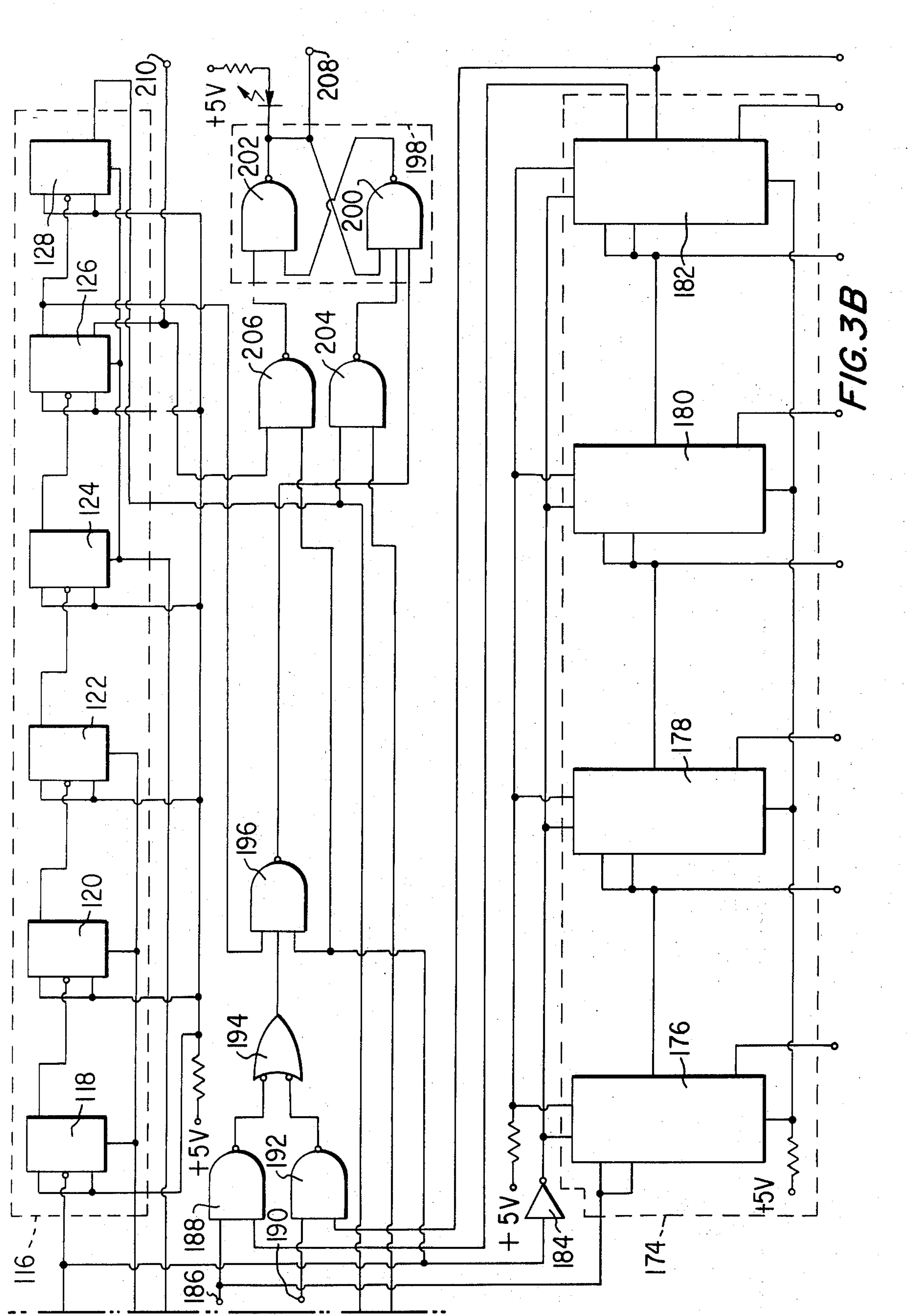

The receiver sequencer is shown in FIG. 3A and 3B having a positive input pulse terminal 78, a negative input terminal 80, and a receiver inhibit terminal 82. Terminals 78 and 80 are connected to terminals 58 and 68, respectively, of the line receiver while terminal 82 is connected to a transmitter, not shown, to cut off the receiver any time a message is being transmitted from the same station. The positive pulse terminal 78 is connected to an input to NAND gate 84 and the negative pulse terminal to an input to NAND gate 86 with the output of these gates being connected to the inputs of NOR gate 88. A synchronizer counter 90 is formed by a pair of J-K flip flops 92 and 94 which have their J and K inputs coupled to a "1" input so as to toggle on each clock pulse. The Q output of flip flop 92 is connected as the clock pulse input of flip flop 94 and as one input to 3 count NAND gate 96 and one input to 0–7 reset NAND gate 98. The $\overline{Q}$ output of flip flop 92 is connected as one input to NAND gate 100 and one input to 0 count NAND gate 102. The output of NAND gate 102 is connected as an input to NAND gate 86, to NAND gate 104 and to inverter 106. The output of NAND gate 84 is connected to the second input of NOR gate 88 while the output of the inverter 106 is connected to an input to first pulse reset NAND gate 108. The output of 3 count NAND gate 96 is connected as the second input to gate 104. The Q output of flip flop 94 is connected to inputs of NAND gates 96 and 100 while the $\overline{Q}$ output is connected to inputs of NAND gates 98 and 102.

The output of 3 count NAND gate 96 is connected through inverter 110, data count NAND gate 112, inverter 114 to data counter 116 which is comprised of six J-K flip flops 118, 120, 122, 124, 126 and 128, each having its J and K inputs connected to a "1" input and its Q output connected to the clock pulse input of the next successive flip flop. The output of 3 count NAND gate 96 is also fed through NAND gate 130 to NOR gate 132.

The output from data counter reset NAND gate 100 is fed through inverter 134 to inverters 136 and 138, which are connected to data counter J-K flip flops 118, 120, 122 and 124, 126, 128 respectively, and to reset terminal 140 which is used to reset circuitry (not shown) normally associated with a receiver of this type.

A window generator 142 includes a window counter 144 which is connected to receive a 10 MHz clock pulse from a source, not shown, at terminal 146 through inverter 148 and feed first, second and third outputs to inputs of NAND gate 150 with the third output also going to inputs of NAND gate 152 and inverter 154. The counter also is connected to a "1" input and to ground. A fourth output is connected to an input of NAND gate 152 and through inverter 156 to an input of NOR gate 158. The NOR gate 158 is connected to receive the output of gate 150 and has its output connected to 0–7 reset NAND gate 98 through inverter 160 and connected to correct pulse reset NAND gate 162. The output of NAND gate 162 is connected through inverter 164 to an input of data count NAND gate 112 and the second input of NAND gate 130 and directly connected to NOR gate 166 which feeds its output through inverter 168 back to window counter 144.

A clock pulse from terminal 146 is fed through inverter 148 to an input of NAND gate 152 which has its output connected as one input to NOR gates 166 and 170, the latter of which is also connected to the output of 0–7 reset NAND gate 98. The output of NOR gate 170 is connected to an input of NAND gate 172 which also receives an input from NAND gate 102. The output of NAND gate 172 is fed to the reset inputs of the synchronizer counter flip flops 92 and 94.

The output of NOR gate 88 is connected to inputs of first pulse reset gate 108, 0–7 reset gate 98, and correct pulse reset gate 162. The receiver inhibit from terminal 82 is fed to an input of correct pulse reset gate 162 as is the third output of the window counter 144 after passing through inverter 154. The output of first pulse reset gate 108 is connected as an input to NOR gates 132 and 166. The output of NOR gate 132 is connected to an input of data counter reset gate 100 and to the clockpulse input of flip flop 92.

The data register 174 is comprised of a series of registers 176, 178, 180 and 182, each of which includes four storage flip flops, connected to receive an input from clockpulse data count gate 112 through inverters 114 and 184. This data register is also timed to "1" inputs and is provided with the usual ouputs. A positive level terminal 186 is connected to terminal 52 of the line receiver, to an input of NAND gate 188 and to an input of data register 174. The negative level terminal 190 is connected to terminal 74 of the line receiver and to an input of NAND gate 192. Gates 188 and 192 also receive inputs from outputs of data register 174. The outputs of NAND gates 188 and 192 are connected as inputs to NOR gate 194 which feeds it output to NAND gate 196. NAND gate 196 also receives inputs from the Q output of flip flop 126 and from data count gate 112 through inverter 114. The output of gate 196 is connected to an error flip flop 198 including NAND gates 200 and 202. The $\bar{Q}$ output of data counter J-K flip flop 128 is connected to inputs of NAND gate 204 and data count gate 112. The output of NOR gate 170 is connected as the other input of NAND gate 204. The output of NAND 204 is connected as an input to gate 200 of flip flop 198. The $\bar{Q}$ output of data counter J-K flip flop 126 is connected to an input of NAND gate 206 as is the output of data counter 112, through inverter 114. The $\bar{Q}$ output of flip flop 126 also goes to terminal 210 to signal the end of the first 16 bit word. The output of gate 206 is fed to an input of gate 202 of flip flop 198. The error output from error flip flop 198 is taken from terminal 208.

As mentioned above, the synchronizing code has been chosen with a "011" bit configuration with "0" represented by a positive going transition in the middle of the bit and "1" by a negative going transition in the middle of the bit.

The received message is taken from the transmission by the line receiver and converted to a series of positive and negative pulses and positive and negative levels. The receiver sequencer reacts to the first positive pulse received at terminal 78. This positive pulse causes the sync counter 90 to advance one count and the input gating to change to enable NAND gate 86 so that a negative pulse can be received at terminal 80 through NAND gate 96 while NAND gate 84 is closed. At the same time this gating change takes place the window generator 142 is started. The window counter 144 generates a window which begins approximately 750 to 850 nanoseconds (NS) after the pulse is received and lasts for approximately 120 nanoseconds.

The window enables 0–7 count gate 98 and correct pulse reset gate 162 for reception of the next pulse which, for the chosen synchronizing code, is a negative pulse. The NAND gate 98 is opened from zero time until NAND gate 162 is opened. If the next pulse received is a negative pulse which occurs before the first window opens these gates, then there is an output through 0–7 reset gate 98 to reset the sync counter 90 and close gate 86. If the next pulse received is positive it will not pass into the receiver sequencer since gate 84 will be closed and reset will take place to condition the receiver sequencer for the next positive pulse. If a negative pulse occurs within the duration of the window, the sync counter 90 is advanced to a count of "2".

It should be noted, with reference to the timing diagram of FIG. 1, that between the "0" and the first "1" of the synchronization code there is not transition. However, between the first "1" and second "1" of the synchronization code there is a transition at the start of the bit. Such a positive going transition would normally indicate an "0" which, if passed, would give an erroneous input. The window is so timed, however, that no input will be passed except for those pulses appearing in the middle of each bit. Thus there will be an input for the second "1", the negative going transition of the center of the third message bit. If this second "1" is correctly received, then the data counter NAND gate 112 is opened, the synchronization count NOR gate 132 inhibited and further pulses are passed to advance the data counter 116. In this manner the entire message is checked for timing, with each successive bit generating the next window, and is also decoded. Should any bit be out of time (fall outside the associated window) the synchronizing counter 90 will be reset by NAND gate 152 counting to 12 (the end of the window) and passing a 10 MHz clockpulse from the source (not shown) to NOR gate 170.

On receipt of the third synchronizing count (the second "1") there is a pulse output from 0–7 reset gate 98 which resets data counter 116. The first data pulse received is passed to the clock pulse input Cp of data counter 116 and to the clockpulse input Cp to shift register 174. Positive levels are clocked into the shift register 174 causing the data to advance in the register one position for each count until a count of sixteen is reached at which time NAND gate 196 is enabled. Positive and negative levels are passed to NAND gates 188 and 192 from input terminals 186 and 190, respectively, and are compared with outputs from the register 174. The second 16 bit word received must be identical with the first 16 bit word. As the second word is received a comparison is made between the input levels of the second word and the outputs levels from the register to see that they are the same. Should any bit of the second word be different from the corresponding bit of the first word, then an error pulse is passed through NAND gate 196 to set the error flip flop 198 which will generate an output used to inhibit the circuitry, for example control points and a transmitter, and prevent any response to the erroneous message from occurring.

Inasmuch as the preferred embodiment of the present invention is subject to many modifications, variations in details and rearrangements of components, it is intended that all matter contained in the foregoing description or shown in the accompanying drawings shall be interpeted as illustrative and not in a limiting sense.

What is claimed is:

1. A method for decoding biphase bit signals contained in multi bit messages, each of the biphase bit signals having a transition between positive and negative phases in the center of each bit time, said method comprising the steps of:

comparing the biphase bit signals with a reference voltage;

generating positive level and positive pulse outputs for each transition of the biphase bit signals above the reference voltage and negative level and negative pulse outputs for each transition of the biphase bit signals below the reference voltage;

generating a window in response to a first one of the positive or negative pulses; and generating a subsequent window each time the next successive positive or negative pulse falls within the time span of the generated window whereby the windows serve to time the pulses to distinguish the biphase bit signals from noise.

2. A method according to claim 1 further comprising the step of;

discriminating incoming biphase bit signals from noise by level comparator means.

3. A method according to claim 1 wherein each of the messages includes a synchronization code, the method further comprising the steps of counting the positive and negative pulses to determine by both timing and pattern the presence of a correct synchronization code; and enabling data register means when the correct synchronization code is determined and registering the messages therein.

4. A method according to claim 3 further comprising the step of selectively enabling gating means so that normally only the first bit of the synchronization code can be received, and resetting said gating means unless the remaining bits of the synchronization code are received within their respective windows and are of the proper pattern.

5. A method according to claim 1 wherein each of said messages includes a double word body formed by first and second identical words further comprising the steps of registering the first word of each message in a data register;

comparing bit-by-bit the levels of the second word of the message with the levels of the first word in said data register; and generating an error signal if the compared levels are not identical.

6. A method according to claim 5 further comprising the step of feeding data in said register to a counter along with the levels of said second word wherein said comparison is made.

7. A method according to claim 5 wherein each of said messages includes a synchronization code, further comprising the steps of counting the pulses and sensing both timing and pattern to determine the presence of a correct synchronization code; and enabling said data register means when the correct synchronization code is determined.

8. An apparatus for decoding biphase bit signals contained in multi bit messages, each of the biphase bit signals having a transition between positive and negative phases in the center of each bit time, said apparatus comprising:

receiver means including means to compare said biphase bit signals with a fixed reference voltage, and means to generate positive level and positive pulse outputs for each transition of the biphase bit signals above said fixed reference voltage and negative level and negative pulse outputs for each transition of the biphase bit signals below said fixed reference voltage; and decoder means connected with said receiver means for generating a window in response to reception of a first one of said positive or negative pulses and generating a subsequent window each time a next successive positive or negative pulse falls within the time span of the preceding generated window.

9. An apparatus according to claim 8 wherein said receiver means further includes level comparator means for discriminating said biphase bit signals from noise.

10. An apparatus according to claim 8 wherein each of said messages includes a synchronization code, said decoder means further comprising:

means to identify the synchronization code including gating means normally enabled to allow only the first pulse of said code to pass;

synchronization code counter means adapted to count each pulse of the code as it is received and change the enabling of said gates as required; and means to reset said gating means when no correct synchronization code is received.

11. An apparatus according to claim 8 wherein said message includes a double word body formed by first and second identical words and further comprising:

means connected to said decoder means to register the double word body of said message including a data counter adapted to store said positive and negative pulses;

a shift register adapted to store said positive and negative levels and responsive to said data counter to compare the levels of said first and second words of said double word body bit-by-bit; and means to generate an alarm when the levels of said first and second words differ.

12. An apparatus according to claim 11 wherein each of said messages includes a synchronization code, said decoder means further comprising means to identify the synchronization code including gating means normally enabled to allow a first one of said positive and negative pulses of said code to pass;

synchronization code counter means for counting each pulse of said code as it is received and changing the enabling of said gates as required; and means to reset said gating means when no correct synchronization code is received.

* * * * *